A. ROITZHEIM.
ARRANGEMENT FOR PREVENTING THE FORMATION OF SMOKE IN THE PRODUCTION OF ZINC.
APPLICATION FILED APR. 1, 1913.
1,152,050.
Patented Aug. 31, 1915.
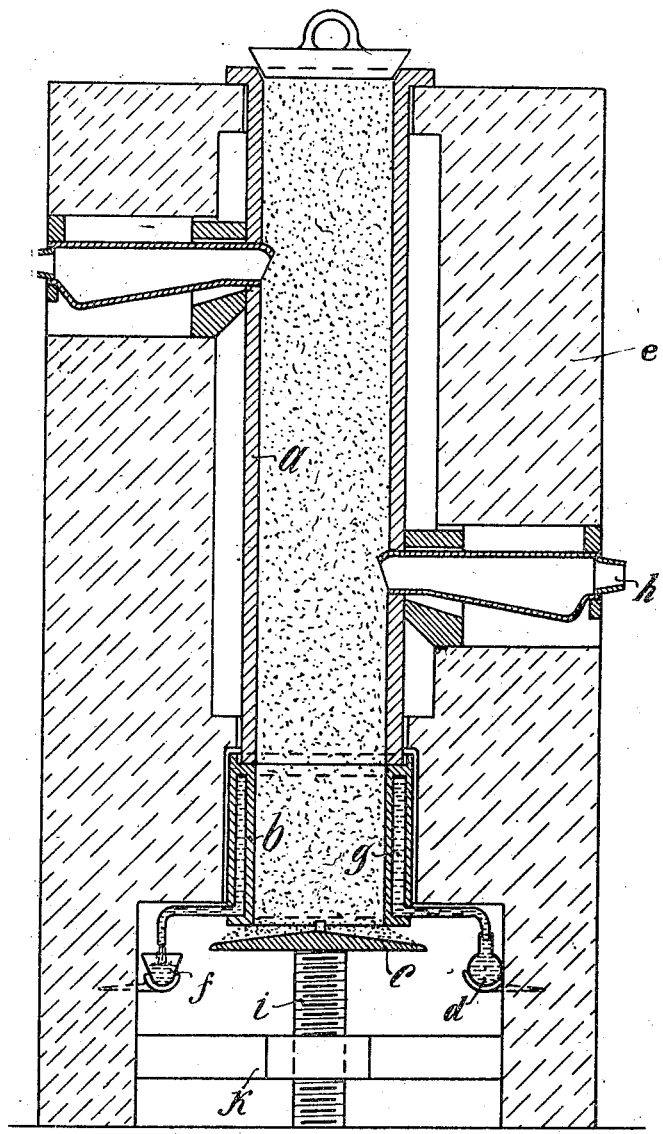

UNITED STATES PATENT OFFICE.

ALEXANDER ROITZHEIM, OF DUISBURG-RUHRORT, GERMANY.

ARRANGEMENT FOR PREVENTING THE FORMATION OF SMOKE IN THE PRODUCTION OF ZINC.

1,152,050.  Specification of Letters Patent.  Patented Aug. 31, 1915.

Application filed April 1, 1913. Serial No. 758,174.

*To all whom it may concern:*

Be it known that I, ALEXANDER ROITZHEIM, subject of the King of Prussia, German Emperor, residing at the city of Duisburg-Ruhrort, in the Kingdom of Prussia, Germany, have invented certain new and useful Improvements in Arrangements for Preventing the Formation of Smoke in the Production of Zinc, of which the following is a specification.

My invention relates to an improvement in plants for the production of zinc, in which the ores are treated in vertical muffles of a zinc reduction furnace. With this method of producing zinc the great amount of smoke is found very disagreeable and to delay the work, which is formed, when the white hot leavings, on being removed from the muffles, come in contact with the atmosphere. This smoke consists of finely divided oxidized zinc, and often also of sulfur and lead compounds, when the ores treated contained sulfur and lead respectively. This smoke is particularly disagreeable in emptying vertical muffles, as it is necessary for the men to enter the space beneath the furnace, that is the space into which the muffles open, for emptying the latter, and as the large quantities of smoke produced can hardly be dealt with in a sufficient manner, even by using artificial draft arrangements.

It is the object of the present invention to obviate these troubles by preventing the formation of such smoke.

The invention consists in that immediately below each of the muffles (of which a plurality is combined in one furnace) a container is provided which is cooled by water or steam, into which container the white-hot leavings emerging from the muffle will enter, being there cooled in such a manner, that the metal compounds contained in them can no more be oxidized. Preferably only such cooling media are employed which have an energetic cooling effect, and as hereinbefore stated, either water or saturated steam is best suited for the purpose. For similar reasons it will be advisable to construct the said cooling vessel of iron, bronze or copper and to make its walls comparatively thin.

In the accompanying drawing the invention is exemplified in a constructional form.

$a$ is a vertical muffle in a furnace $e$, which is heated in a suitable manner.

$b$ is a jacketed vessel made of a suitable metal, between the double walls of which a current of water or steam flows, so that an effective cooling is obtained. The vessel is suspended in a suitable manner, and held tightly against the lower edge of the muffle, so that it may be considered to form an extension of the muffle. This vessel is closed below by a gate or as shown in the drawing by the leavings themselves heaped on the conical plate $c$. This place $c$ is secured to a screw $i$, which screws in the stationary plate $k$, whereby the said conical plate $c$ can be raised or lowered to control the rapidity of the discharge and thereby regulate the degree of cooling of the leavings.

$d$ is the supply pipe for the cooling water, which flows through the jacket space $g$ between the walls of the vessel $b$ and runs out through suitable outlet pipes into a discharge or gutter $f$.

$h$ are windows in the walls of the furnace for observing the process within the muffle.

The operation is as follows: The leavings are removed at the lower end of the vessel $b$. The white hot contents of the muffle will then sink down into the said vessel $b$, where the leavings will be cooled down so far that they emerge into the atmosphere at so low a temperature that no oxidization will occur. The height of the vessel $b$ will obviously depend on the area of the muffle and the rapidity at which the latter is to be emptied.

I claim:

1. In a zinc retort furnace, a hollow cooled element forming an extension of the muffle outside of the heating zone, and means for circulating a cooling medium through said element, said element operating to chill the residues after passing through the retort.

2. In a zinc retort furnace, a vertically arranged hollow cooling element forming a support for the retort, and an extension thereof arranged outside of the heating zone and operating to cool the residues after having passed through the retort.

3. In a zinc retort furnace, the combination with a vertical retort, of a hollow cooling element for supporting said retort and forming an extension thereof outside of the heating zone and operating to cool the residues after they have passed through the retort, means coöperating with said extension to regulate the cooling action thereof, and means for circulating a cooling medium through the cooling element.

In testimony whereof I affix my signature in presence of two witnesses.

ALEXANDER ROITZHEIM. [L. S.]

Witnesses:
    HELEN NUFER,
    ALBERT NUFER.